United States Patent [19]
Hatayama

[11] Patent Number: 6,076,120
[45] Date of Patent: Jun. 13, 2000

[54] SYSTEM FOR COMPOSITING A PLURALITY OF PAGES SAID PAGES BEING CLASSIFIED INTO THREE PARTS EACH PART TO BE COMPOSED IN A DIFFERENT DATA FORMAT

[75] Inventor: Fumihiro Hatayama, Kyoto, Japan

[73] Assignee: Dainippon Screen Mfg. Co., Ltd., Kyoto, Japan

[21] Appl. No.: 09/028,644

[22] Filed: Feb. 24, 1998

[30] Foreign Application Priority Data

Feb. 25, 1997 [JP] Japan ..................................... 9-040730

[51] Int. Cl.⁷ ..................................................... G06F 13/14
[52] U.S. Cl. ............................ 710/20; 709/236; 709/246; 711/142; 711/146; 707/528
[58] Field of Search ............................... 710/20; 709/236, 709/246; 711/146, 142; 358/1–15; 707/500, 528

[56] References Cited

U.S. PATENT DOCUMENTS

| | | | |
|---|---|---|---|
| 5,495,561 | 2/1996 | Holt | 395/114 |
| 5,566,278 | 10/1996 | Patel et al. | 395/114 |
| 5,861,961 | 1/1999 | Silverbrook | 358/450 |
| 5,919,249 | 7/1999 | Herbstman et al. | 709/246 |
| 5,943,680 | 8/1999 | Shimizu et al. | 707/528 |

*Primary Examiner*—Thomas C. Lee
*Assistant Examiner*—Abdelmoniem Elamin
*Attorney, Agent, or Firm*—McDermott, Will & Emery

[57] ABSTRACT

Data formats (page description data, intermediate data and raster data) for compositing respective ones of first to fifth pages with each other are previously determined. An interpreter and a renderer convert the respective pages to the data formats for compositing the same with each other. A page requiring no conversion is not converted. After the conversion, the pages expressed in the page description data, the intermediate data and the raster data are subjected to first composition, second composition and third composition respectively. The composition and the conversion can be dispersively performed, to enable processing in a short time without increasing the quantity of data in individual processing. Thus provided are an apparatus for and a method of processing printing data, which can process data in a short time with high throughput.

12 Claims, 11 Drawing Sheets

| KEY | VALUE |
|---|---|
| TYPE | PAGE |
| DATA FORMAT | PAGE DESCRIPTION DATA |
| DATE | 1996, 12, 10, 11, 15 |
| ⋮ | ⋮ |

SYSTEM FOR COMPOSITING A PLURALITY OF PAGES SAID PAGES BEING CLASSIFIED INTO THREE PARTS EACH PART TO BE COMPOSED IN A DIFFERENT DATA FORMAT

BACKGROUND OF THE INVENTION

1. Field of the Invention

The present invention relates to an apparatus for and a method of processing printing data of printed matter formed by a plurality of pages.

2. Description of the Background Art

In a step of preparing printed matter formed by a plurality of pages, a part of the plurality of pages is generally outputted as a single plate (or film), to be printed. In this case, the respective ones of the plurality of pages are formed independently of each other and composited with each other through the so-called assembling, to be outputted as a single plate.

Figure 10:
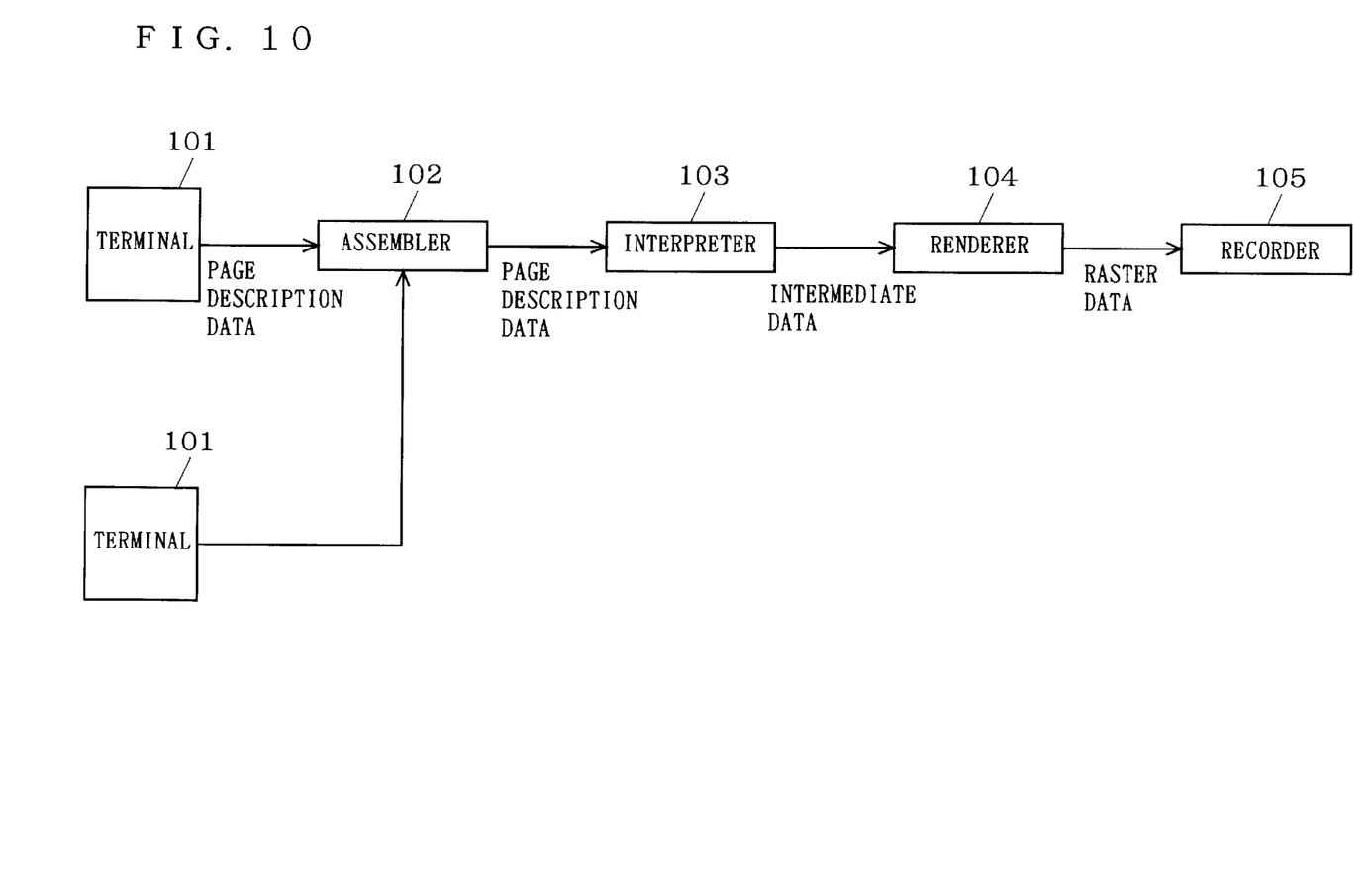
FIG. 10 is adapted to illustrate first exemplary conventional composition.

FIG. 10 is adapted to illustrate first exemplary conventional composition processing. For convenience of illustration, it is assumed here that two pages are composited with each other.

Terminals 101 of a composition processor form printing data (hereinafter referred to as "page data") expressing the respective ones of a plurality of pages. The page data are in the following three data formats:

(1) "page description data" (e.g., "PDL" or "PDF") understandable by a programmer (2) "intermediate data" (e.g., "run-length data") before bit-mapped development (3) "raster data" (the so-called "bit-mapped data") which is the final output form As shown in FIG. 10, the pages formed by an operator through the terminals 101 are generally expressed in page description data. Strictly, the operator forms an original expressed in page description data through the terminals 101 so that the original is split into the respective pages, while it is assumed that the pages are formed through the terminals 101, in order to simplify the illustration. An assembler 102 composites two pages which are expressed in page description data with each other. This assembler 102 merely composes a single plate from two pages, and the composed plate is expressed in page description data. Whether the two terminals 101 form pages respectively or either terminal 101 forms two pages, the respective pages are formed independently of each other, to be composited with each other through the assembler 102.

An interpreter 103 converts the composed plate to intermediate data, which in turn is further converted to raster data through a renderer 104. A recorder 105 outputs the plate expressed in the raster data, which can be outputted as printed matter, to complete the series of processing.

Figure 11:
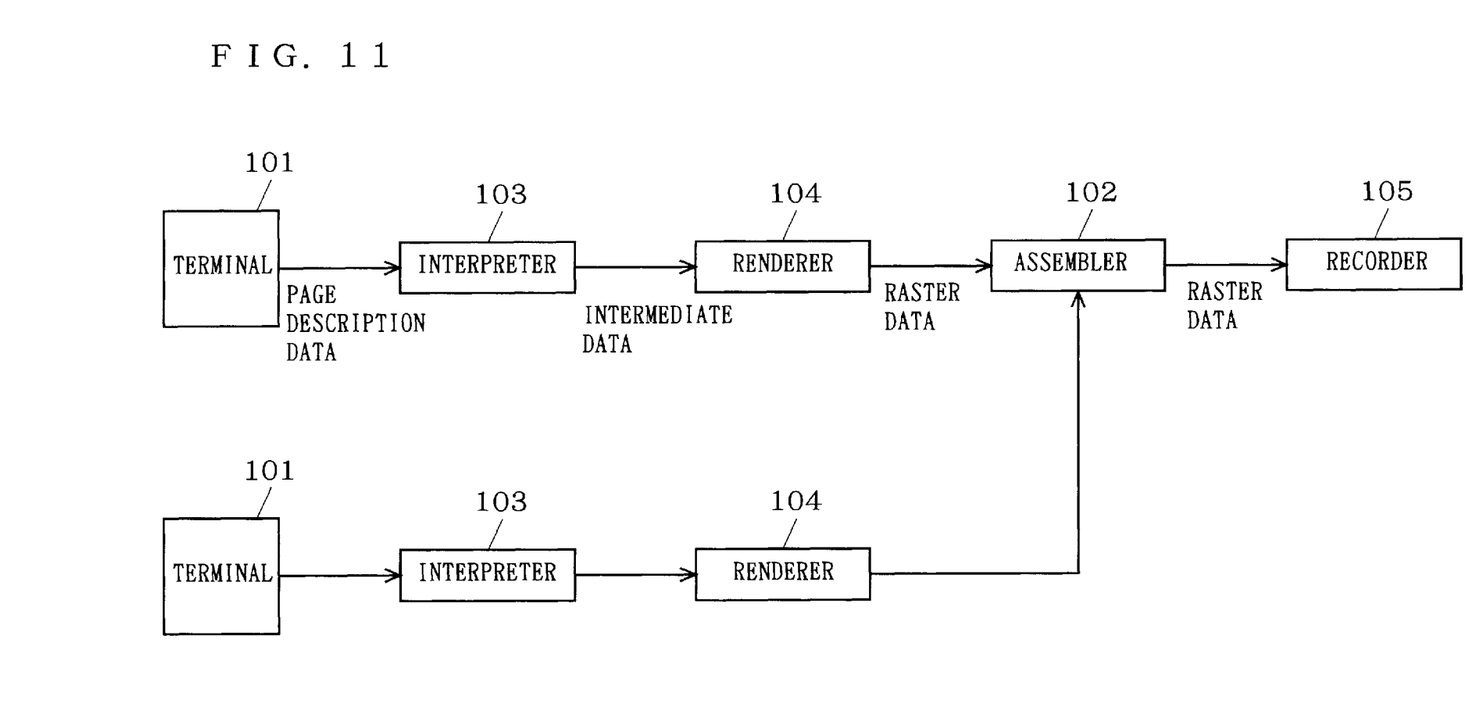
FIG. 11 is adapted to illustrate second exemplary conventional composition.

FIG. 11 is adapted to illustrate second exemplary conventional composition processing. In this example, two terminals 101 form pages in a page description data, which in turn are converted from intermediate data to raster data independently of each other through interpreters 103 and renderers 104 respectively. An assembler 102 composes a single plate from the two pages expressed in the raster data. A recorder 105 outputs the composed plate, which is expressed in raster data similarly to the aforementioned first conventional example.

The difference between the first and second conventional examples resides in that whether the pages are composited with each other in a page description data format or a raster data format, and the modes of the plates finally inputted in the recorders 105 are identical to each other.

However, the aforementioned conventional examples have the following problems respectively:

The first conventional example converts the data format of the plate after page composition, and hence the quantity of converted data is increased to require a long time for the processing. In this case, the composition processor may comprise a plurality of CPUs for performing the processing in a split manner, while it is difficult to split the composed plate formed by single data. If the pages forming the plate are prepared in different periods, further, the processing cannot be started until all pages are prepared, and hence the throughput of the overall unit cannot be improved. If the pages are formed in different data formats (when a certain terminal 101 forms a page of a raster data format, for example), further, the pages cannot be composited with each other unless the data formats thereof are equalized with each other.

On the other hand, the second conventional example composites the pages expressed in raster data with each other. In general, however, the information quantity of raster data is so large that a long time is required for compositing pages expressed in the raster data with each other, and hence it is difficult to improve the throughput as a result.

Further, pages once composited with each other may be corrected later. When page data are corrected, all processing must be performed again in both conventional examples, to remarkably reduce workability.

SUMMARY OF THE INVENTION

The present invention is directed to an apparatus for obtaining printing data for printed matter by compositing a plurality of pages with each other.

The apparatus is adapted to obtain printing data for printed matter by compositing a plurality of pages with each other. The plurality of pages are classified into a first part to be composed in a page description data format, a second part to be composed in an intermediate data format, and a third part to be composed in a raster data format. The apparatus comprises data format conversion means comprising first conversion means for converting the page description data format to the intermediate data format, and second conversion means for converting the intermediate data format to the raster data format, control means comprising first control means for acquiring a first page group expressed in the page description format from the first part of the plurality of pages, second control means for controlling the data format conversion means thereby converting the second part of the plurality of pages to a second page group expressed in the intermediate data format, and third control means for controlling the data format conversion means thereby converting the third part of the plurality of pages to a third page group expressed in the raster data format, and data composition means comprising first composition means for compositing the first page group, second composition means for compositing the second page group, and third composition means for compositing the third group, for obtaining the printing data from the first to third page groups. The first to third composition means are operable independently of each other.

Composition of a plurality of pages and data format conversion can be dispersively performed, whereby the quantity of data in individual processing is not remarkably increased, the processing can be performed in a short time, and the throughput can be improved.

In a preferred embodiment of the present invention, the apparatus further comprises means for replacing a specified page of the printing data obtained by the data composition means with a new page.

Only a difference around correction can be re-composed without performing all processing again, whereby correction can be readily performed without reducing workability.

The present invention is also directed to a method of obtaining printing data for printed matter by compositing a plurality of pages with each other.

Accordingly, an object of the present invention is to provide an apparatus for and a method of processing printing data having high throughput, which can process data in a short time.

Another object of the present invention is to provide an apparatus for and a method of processing printing data which can readily correct data to be corrected later.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described in detail with reference to the drawings.

Figure 1:
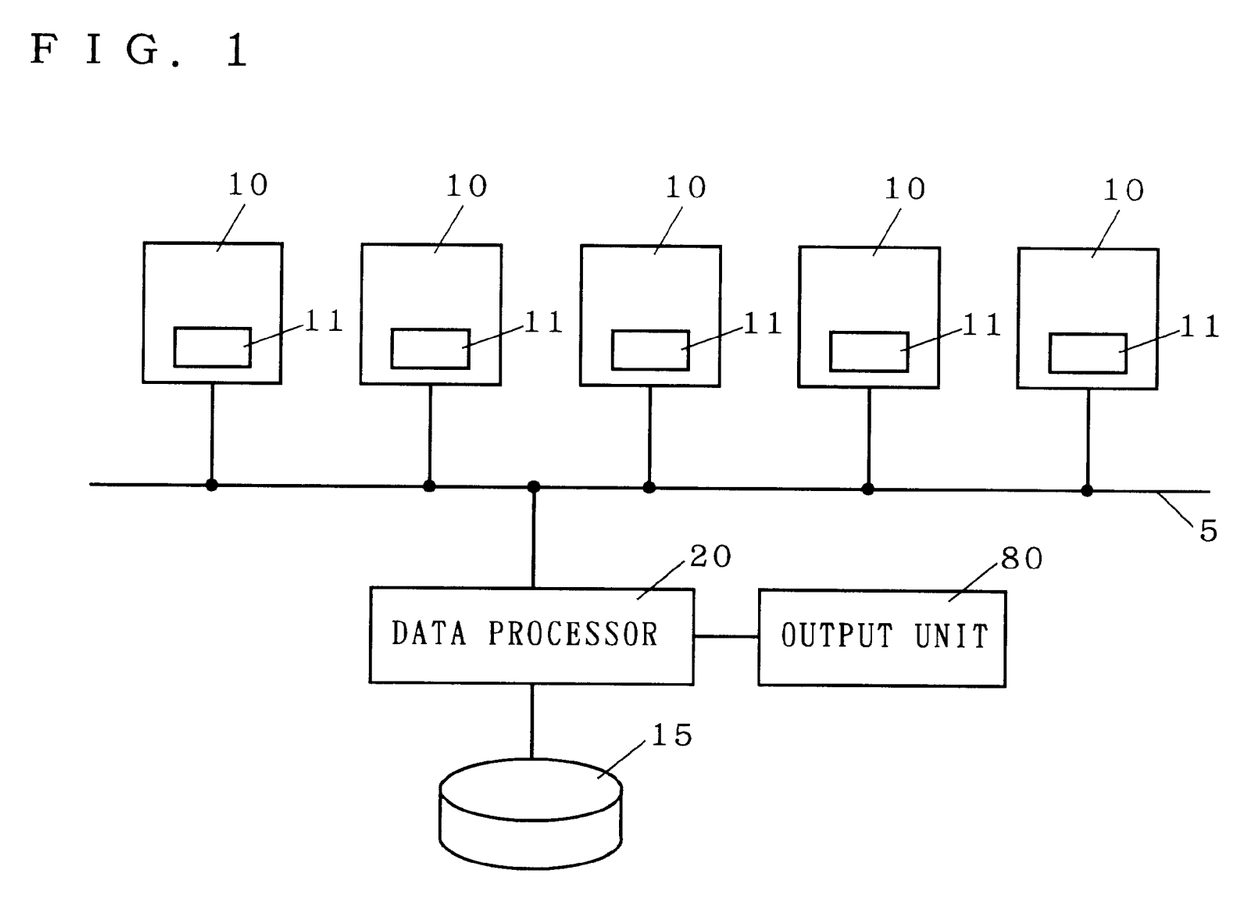
FIG. 1 illustrates an exemplary structure of a system into which a printing data processor according to the present invention is assembled.

A. Outline of Structure of Data Processor:

FIG. 1 illustrates an exemplary structure of a system into which a printing data processor 20 according to the present invention is assembled. Five terminals 10 and the data processor (printing data processor) 20 form a network through a data line 5. The terminals 10, which are desktop computers, have functions of forming originals on the basis of instructions by an operator. Printer drivers 11 output the originals formed by the terminals 10 in the data format of page description data. The format of the data outputted from the terminals 10 is not restricted to the page description data format, but the terminals 10 may preserve previously formed raster data or intermediate data in magnetic disks or the like for outputting the same. Further, the terminals 10 may be workstations, and the number thereof is not restricted to five but at least one terminal 10 may be provided.

The data processor 20 has a function of splitting the plurality of originals formed by the terminals 10 into pages, composing a single plate from the plurality of pages, and transferring the same to an output unit 80 as raster data. The data processor 20, which is connected with the output unit 80, comprises a magnetic disk 15.

Figure 2:
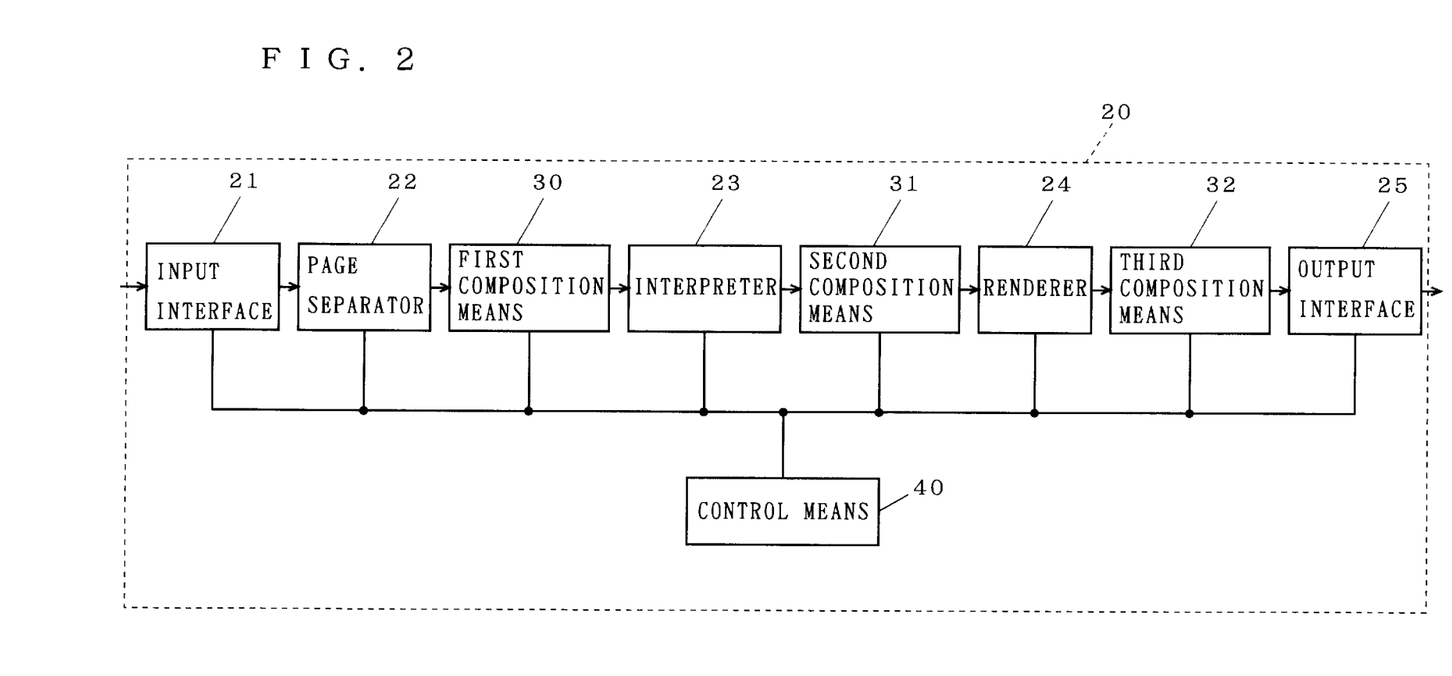
FIG. 2 is a functional block diagram schematically showing the structure of the inventive data processor shown in FIG. 1.

FIG. 2 is a functional block diagram schematically showing the structure of the data processor 20 according to the present invention. As shown in FIG. 2, the data processor 20 comprises an input interface 21, a page separator 22, first composition means 30, an interpreter 23, second composition means 31, a renderer 24, third composition means 32 and an output interface 25, for feeding the data of the originals transferred from the respective terminals 10 in this order and outputting the same to the output unit 80.

The input and output interfaces 21 and 25 are employed for connection with the terminals 10 and the output unit 80 respectively. The page separator 22 is a processing part for splitting the originals formed in the terminals 10 into pages. The first, second and third composition means 30, 31 and 32 are processing parts for compositing the pages expressed in page description data, intermediate data and raster data with each other respectively. Further, the interpreter 23 is a processing part for converting the page description data to the intermediate data, and the renderer 24 is a processing part for converting the intermediate data to the raster data.

The data processor 20 is further provided therein with control means 40 for controlling the respective processing parts. While the control means 40 is formed by a CPU, the number of such CPU is not restricted to one but a plurality of CPUs are preferably provided. If the control means 40 is formed by a plurality of CPUs, these CPUs can deal with pages forming a single plate, to result in improvement of the throughput.

The magnetic disk 15 stores processing software for the data processor 20, as well as page data of various data formats described later and operational information of the data processor 20.

Figure 3:
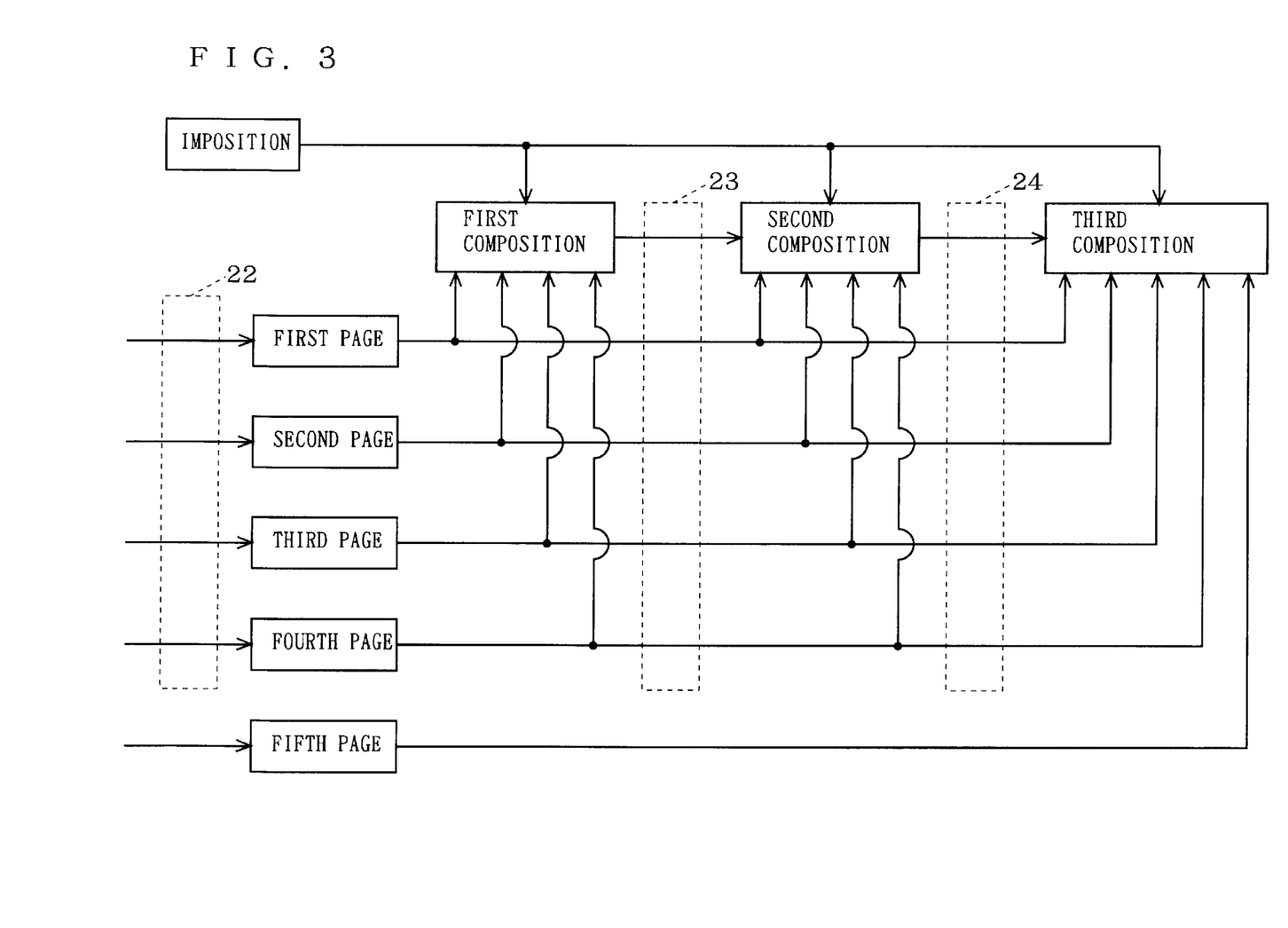
FIG. 3 is adapted to illustrate a state of the data processor shown in FIG. 2 processing a plurality of page data.
Figure 4:
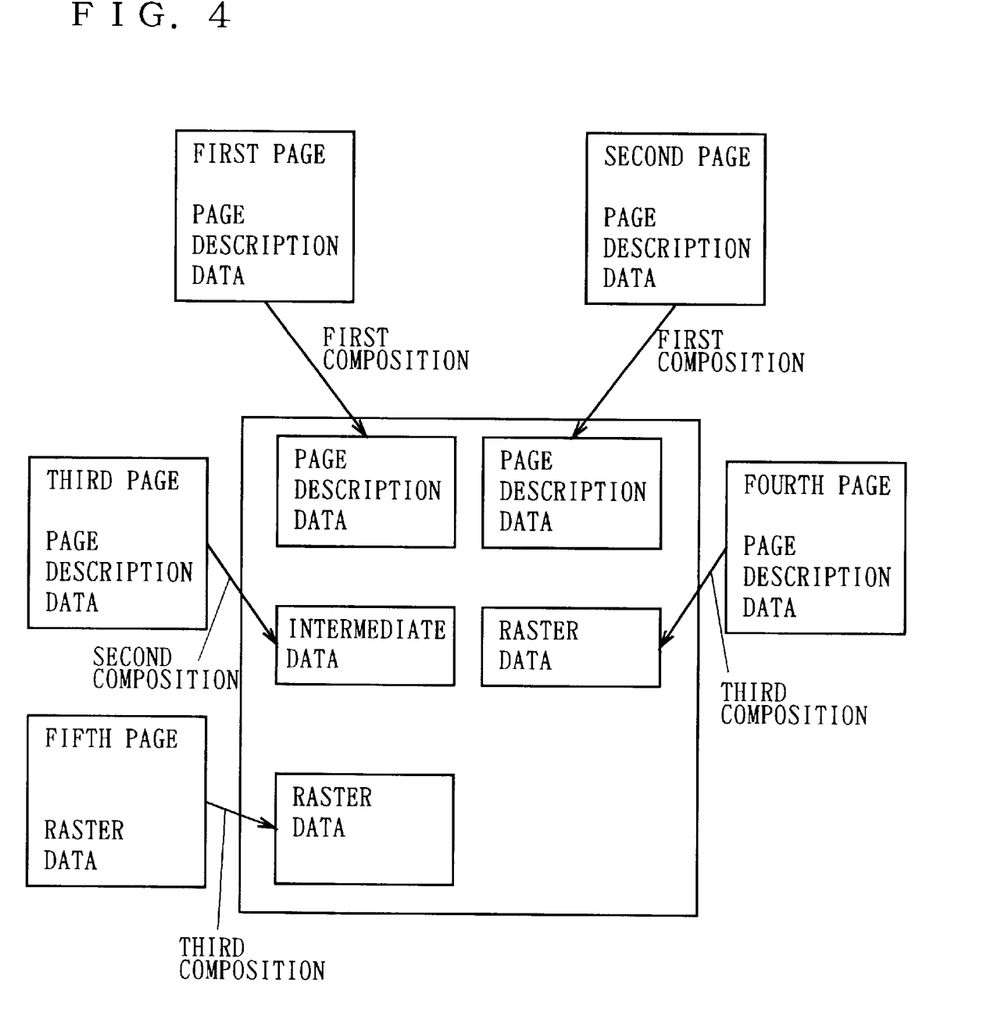
FIG. 4 is a conceptual diagram showing exemplary composition of a plurality of pages.
Figure 7:
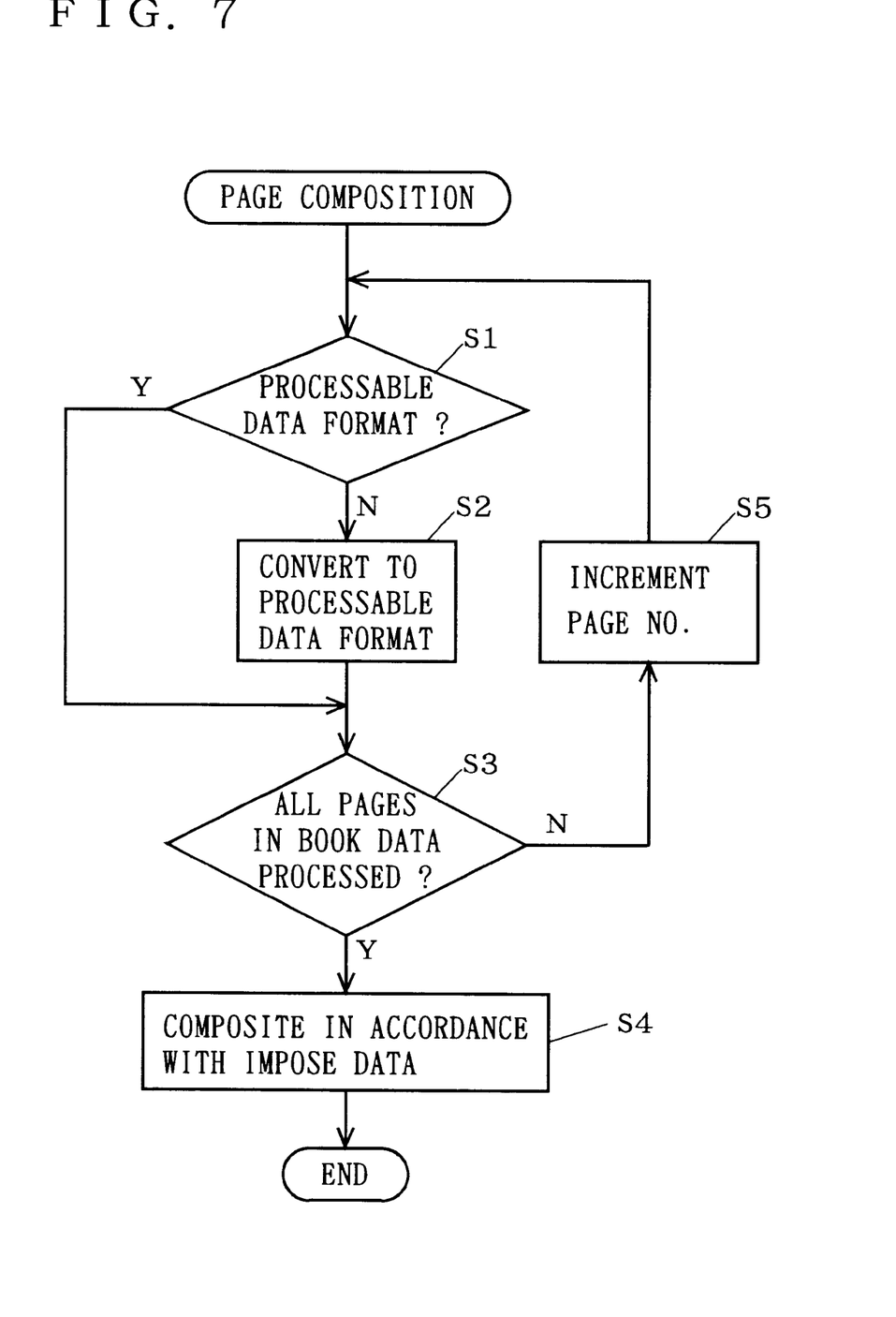
FIG. 7 is a flow chart showing the procedure of page composition in the data processor shown in FIG. 2.

B. Contents of Page Composition:

The contents of the page composition in the data processor 20 having the aforementioned structure are now described with reference to concrete examples. FIG. 7 is a flow chart showing the procedure of the page composition in the data processor 20. FIG. 3 is adapted to illustrate a state of the data processor 20 processing a plurality of page data. FIG. 4 is a conceptual diagram showing exemplary composition of a plurality of pages.

In advance of the page composition, the data processor 20 first performs page splitting, in order to unify the sizes of the pages forming printed matter. Namely, the page separator 22 splits the originals formed in the terminals 10 and transferred to the data processor 20, so that the split pages are composited with each other. In the example employed here, the data processor 20 composites five pages, i.e., first to fifth pages with each other, as shown in FIG. 3. In this case, the page separator 22 separates originals (first to fourth pages in FIG. 3) expressed in page description data, and data (fifth page in FIG. 3) transferred as raster data from the beginning is not split since the same is already page unit data. These five pages may be transferred from a single or different terminals 10. The data format is not converted by the page splitting.

In the composition of the split pages, the control means 40 first determines whether or not the page data of the object pages are in a processable data format at a step SI (FIG. 7). The operator previously specifies the data formats for compositing the respective pages with each other, and the current data formats of the respective pages can be determined through identifiers. This is now described with reference to FIGS. 5 and 6.

Figure 5:
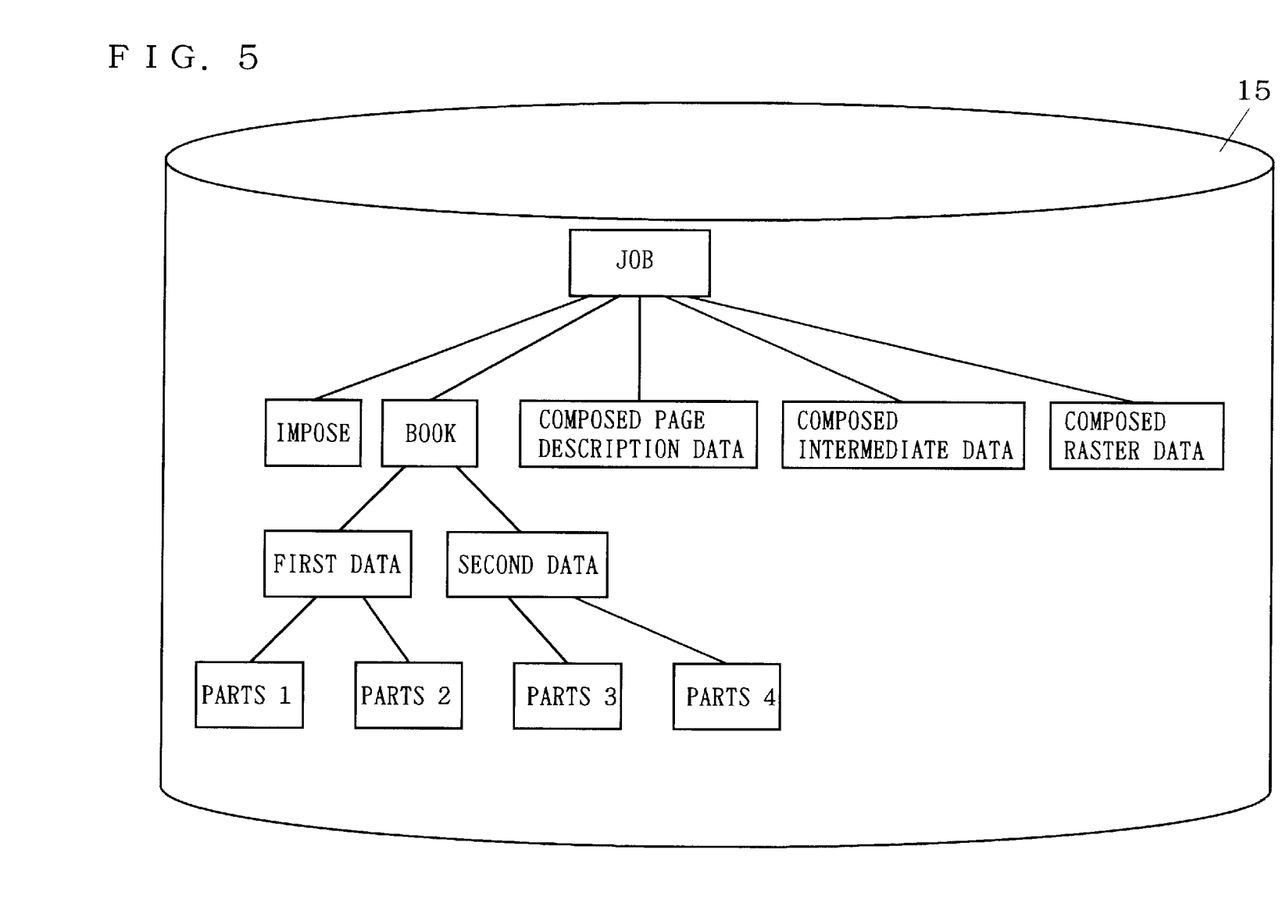
FIG. 5 illustrates an exemplary hierarchical structure of data stored in a magnetic disk.
Figure 6:
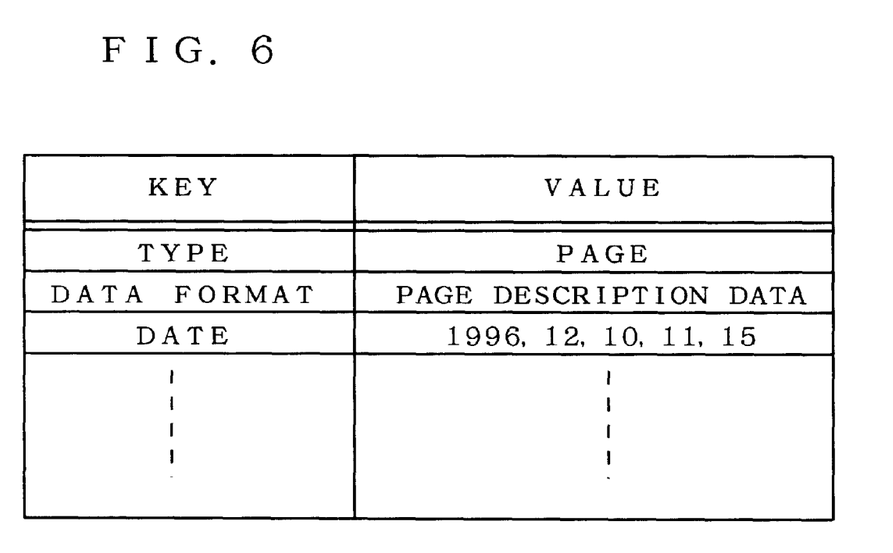
FIG. 6 illustrates principal part of page management data provided as part of page data.

FIG. 5 illustrates an exemplary hierarchical structure of the data stored in the magnetic disk 15, and FIG. 6 illustrates principal part of page management data provided as part of the page data.

The magnetic disk 15 stores job data, impose data, book data, page data, parts data, composed page description data, composed intermediate data and composed raster data in the hierarchical structure shown in FIG. 5. The job data indicate operational information of the data processor 20, and the operator previously specifies and records in what data formats the respective pages must be composited with each other in the job data. The impose data records page arrangement information after the page composition, i.e., assembling information.

The book data, the page data and the parts data indicate the printed matter which is the final product, the pages forming the printed matter, and parts described on the pages respectively. While FIG. 5 shows only the data of the first and second pages for convenience of illustration, the magnetic disk 15 stores data of all pages forming the printed matter as the page data. The page management data shown in FIG. 6 are recorded in part of the page data.

The principal part of the page management data is formed by "keys" indicating the attributes of the pages and "values" thereof, as shown in FIG. 6. The "keys" include "type", "data format", "date" and the like, for example. The control means 40 recognizes the "data format" of the page management data as the identifier indicating the current data format. In case of FIG. 6, therefore, the control means 40 determines that the data format of this page is the page description data format. If the data format of the page is converted, the "values" are also changed following this.

Referring again to FIG. 7, the control means 40 compares "the data formats for compositing the pages" recorded in the job data with the "data formats" determined from the page management data at the step S1.

For example, it is assumed that the job data records that "the first and second pages are composited in page description data, the third page is composited in intermediate data, and the fourth and fifth pages are composited in raster data" in FIG. 3. However, the first to fourth pages are expressed in "page description data" splitting the originals of the page description data, and the fifth page is expressed in "raster data". Therefore, the control means 40 determines that the first page is in a processable data format at the step S1, and advances to a step S3.

At the step S3, the control means 40 determines whether or not the processing is performed as to all pages included in the book data. Only the first page is processed in this case and hence the control means 40 advances to a step S5 to increment the number of the processed page to 2. Thereafter the control means 40 returns to the step S1 again, for processing the second page.

The control means 40 also determines the second page as processable since the data format for compositing the same matches with the current data format, and performs a process similar to the above.

The control means 40 determines the third page as unprocessable since the data format for compositing the same is "intermediate data" and the currently determined data format is "page description", and advances to a step S2 for converting the data format of the third page to that for compositing the same. The interpreter 23 performs this processing for converting the page description data to the intermediate data. After conversion of the data format, the control means 40 advances to the step S3, for performing processing similar to the above. The control means 40 determines the fourth page as unprocessable since the data format for compositing the same is "raster data" and the currently determined data format is "page description data", and returns to the step S2 for converting the data format of the fourth page. At this time, the interpreter 23 converts the page description data to the intermediate data, and thereafter the renderer 24 converts the intermediate data to the raster data. After the conversion of the data format, the control means 40 advances to the step S3 for performing processing similar to the above.

Then, the control means 40 determines the fifth page as processable since the data format for compositing the same is "raster data" and the currently determined data format is also "raster data", and advances to the step S3 without converting the data format. The control means 40 repeats a procedure similar to the above for completely processing all pages of the printed matter to be processed, and then advances to a step S4.

All pages are in the data formats for compositing the same in the stage of the step S4, so that the composition is performed in accordance with the impose data. FIG. 4 conceptually illustrates this processing. At the step S4, the first, second and third composition means 30, 31 and 32 perform the composition in response to the data formats of the pages to be composited with each other. Namely, the first composition means 30 composites the first and second pages expressed in the page description data to form a plate. Arrangement of the pages in the composition is decided in accordance with the impose data. The interpreter 23 converts the plate composed in the first composition means 30, which is in the page description data, to intermediate data. The second composition means 31 composites the plate converted to the intermediate data with the third page. Arrangement of the third page is also decided in accordance with the impose data. The renderer 24 converts a plate composed in the intermediate data format to raster data. The third composition means 32 composites the plate converted to the raster data with the fourth and fifth pages. Also in this case, arrangement of the pages is decided in accordance with the impose data.

Thus, a single plate is composed from the first to fifth pages, as shown in FIG. 4. The composed plate is transferred to the output unit 80 through the output interface 25, to be outputted.

The feature of the aforementioned processing resides in that the composition of the plurality of pages and the data format conversion are dispersively performed. Due to the dispersion of the composition and the data format conversion, the quantity of data in individual processing is not remarkably increased, whereby short time processing is enabled. Particularly when the control means 40 comprises a plurality of CPUs, the throughput can be remarkably improved since each CPU can deal with each processing.

The composition and the data format conversion are dispersively performed also when the pages are formed in different periods or in different data formats, whereby the throughput is not remarkably reduced. For example, the data format of only the fifth page is different in the above example. Even if formation of the fourth page is delayed in the above, data format conversion of the first to third pages and composition by the first and second composition means 30 and 31 are possible.

The above is a mere example, and the first to fourth pages expressed in the page description data can be composited with each other in any composition means as shown in FIG. 3, when the data format for compositing the same recorded in the job data is converted to another format. For example, it is also possible to specify the first to fourth pages to be composited with each other in the raster data format. In this case, however, the third composition means 32 composites all pages with each other similarly to the second conventional example, and improvement of the throughput cannot be expected as a result. When the operator records the data formats for compositing the pages with each other in the job data, therefore, it is preferable to disperse the composition if possible. However, it is not approved to specify the page such as the fifth page expressed in raster data in advance of the processing to be composited in the first or second composition means 30 or 31.

C. Page Replacement:

The pages composited with each other in the aforementioned manner may be corrected in general. For example, parts data forming the pages may be changed later. In this case, the data processor 20 performs page replacement. This page replacement is now described.

Figure 8:
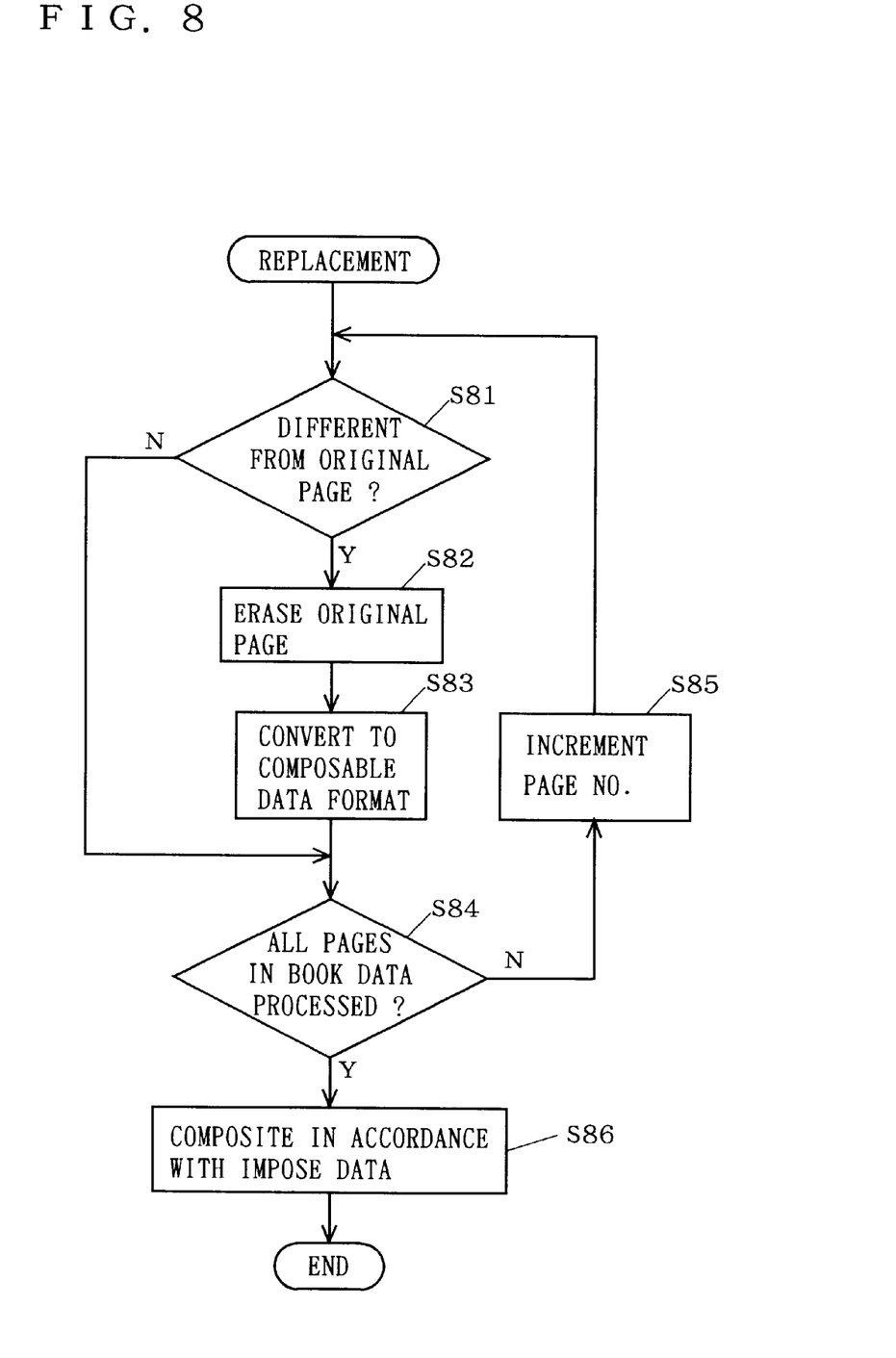
FIG. 8 is a flow chart showing an exemplary procedure of page replacement.

FIG. 8 is a flow chart showing an exemplary procedure of the page replacement. In this case, originals for printed matter are partially corrected and the corrected originals are inputted in the data processor 20 from any terminal 10. Therefore, pages (hereinafter referred to as "corrected pages") related to the corrected originals split by the page separator 22 include unchanged and changed pages.

At a step S81, the control means 40 compares each corrected page to be processed with the original page corresponding thereto, and makes a determination as to presence/absence of difference. If the corrected page is identical to the original page, the control means 40 advances to a step S84 for determining whether or not the processing is performed on all pages included in book data. If any unprocessed page remains, the control means 40 increments the page number (step S85), and returns to the step S81.

If the corrected page is different from the original page, on the other hand, the control means 40 advances to a step S82, for erasing the original page corresponding to the corrected page. The control means 40 may not necessarily erase the original page but may overwrite or insert the corrected page on or in the original page. Then, the control means 40 advances to a step S83, for converting the page data of the corrected page to a data format for compositing the same. This conversion is adapted to convert the page data to the data format for compositing the same previously specified and recorded by the operator in the job data, identically to the processing at the step S2 shown in FIG. 7. When the data format of the corrected page is identical to that for compositing the same, the control means 40 directly advances to a step S84 without converting the data format.

The control means 40 repeats the aforementioned procedure for completing the processing on all pages included in the book data, and then advances to a step S86 for compositing the corrected pages with each other in accordance with the impose data. This processing is identical to that at the step S4 in FIG. 7. If the corrected page is converted to raster data, for example, the third composition means 32 composites the plate with this page. At the step S86, only the corrected pages determined as being different from the original pages at the step S81 are composited.

Figure 9:
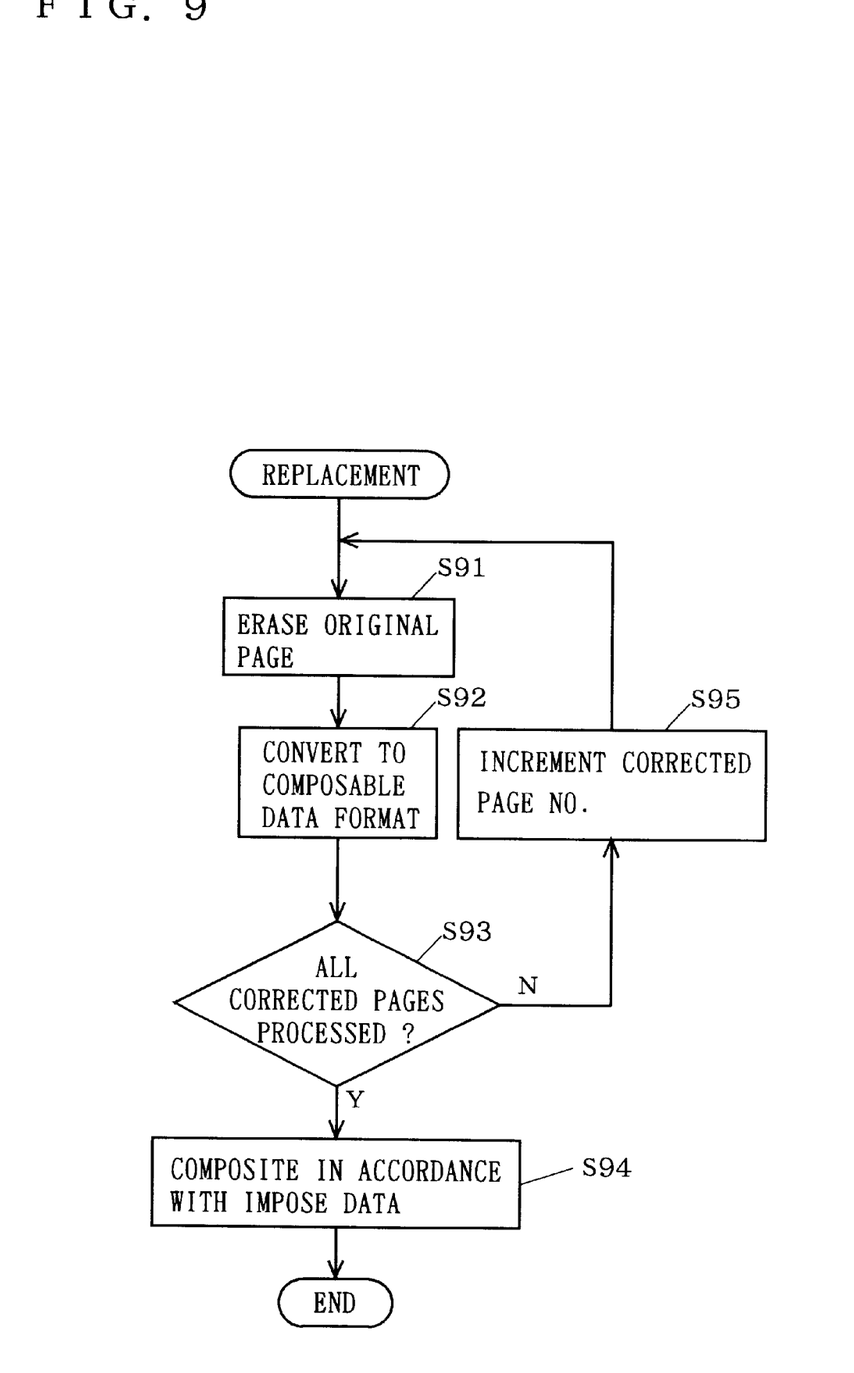
FIG. 9 is a flow chart showing another exemplary procedure of page replacement.

FIG. 9 is a flow chart showing another exemplary procedure of page replacement. In this case, printed matter is partially corrected and only the corrected part is inputted in the data processor 20. Therefore, corrected pages include only changed pages.

At a step S91, the control means 40 erases an original page corresponding to each corrected page. This processing is identical to that at the step S82 in FIG. 8. The control means 40 may not necessarily erase the original page but may overwrite or insert the corrected page on or in the original page.

Then, the control means 40 advances to a step S92, for converting the page data of the corrected page to a data format for compositing the same. This conversion is adapted to convert the page data to the data format for compositing the same previously specified and recorded by the operator in the job data, identically to that at the step S2 shown in FIG. 7. The control means 40 performs no conversion when the data format of the corrected page is identical to that for compositing the same, similarly to the above.

Then, the control means 40 advances to a step S93, and determines whether or not all corrected pages are processed. If the determination is of NO, the control means 40 increments the number of the corrected pages (step S95), and returns to the step S91.

If the determination at the step S93 is of YES, on the other hand, the control means 40 advances to a step S94, and composites the corrected pages in accordance with the impose data. If the corrected page is converted to intermediate data, for example, the second composition means 31 composites the plate with this page, identically to the processing at the step S4 in FIG. 7.

Either processing shown in FIG. 8 or 9 is adapted to re-composite only differences around correction in common. Not the entire processing is repeated but only the pages changed by correction are re-composited, whereby the pages can be readily corrected without reducing the workability.

While the invention has been shown and described in detail, the foregoing description is in all aspects illustrative and not restrictive. It is therefore understood that numerous modifications and variations can be devised without departing from the scope of the invention.

I claim:

1. An apparatus for obtaining printing data for printed matter by compositing a plurality of pages with each other, said plurality of pages being classified into:

a first part to be composed in a page description data format, a second part to be composed in an intermediate data format, and a third part to be composed in a raster data format, said apparatus comprising:

a) data format conversion means comprising:

a-1) first conversion means for converting said page description data format to said intermediate data format, and a-2) second conversion means for converting said intermediate data format to said raster data format;

b) control means comprising:

b-1) first control means for acquiring a first page group being expressed in said page description format from said first part of said plurality of pages, b-2) second control means for controlling said data format conversion means thereby converting said second part of said plurality of pages to a second page group being expressed in said intermediate data format, and b-3) third control means for controlling said data format conversion means thereby converting said third part of said plurality of pages to a third page group being expressed in said raster data format; and c) data composition means for obtaining said printing data from said first to third page groups comprising:

c-1) first composition means for compositing said first page group, c-2) second composition means for compositing said second page group, and c-3) third composition means for compositing said third group, wherein said first to third composition means are operable independently of each other.

2. The apparatus in accordance with claim 1, wherein said second control means comprises:

b-2-1) means for extracting a first objective page being expressed in page description data from said second part of said plurality of pages, and b-2-2) means for converting said first objective page to said intermediate data format by activating said first conversion means.

3. The apparatus in accordance with claim 2, wherein said third control means comprises:

b-3-1) means for extracting a second objective page being expressed in page description data from said third part of said plurality of pages, b-3-2) means for converting said second objective page to a third objective page of said intermediate data format by activating said first conversion means, and b-3-3) means for converting said third objective page to said raster data format by activating said second conversion means.

4. The apparatus in accordance with claim 3, wherein each of said plurality of pages includes contents and page management data, said page management data includes an identifier indicating the data format of said contents, and said control means refers to said identifier.

5. The apparatus in accordance with claim 4, further comprising:

d) means for replacing a specified page of said printing data obtained by said data composition means with a new page.

6. The apparatus in accordance with claim 5, wherein said intermediate data format is a run-length format.

7. A method of obtaining printing data for printed matter by compositing a plurality of pages with each other, comprising steps of:

a) classifying said plurality of pages into:
a first part to be composed in a page description data format,
a second part to be composed in an intermediate data format, and
a third part to be composed in a raster data format;

b) acquiring a first page group being expressed in said page description format from said first part of said plurality of pages;

c) compositing said first page group;

d) converting said second part of said plurality of pages to a second page group being expressed in said intermediate data format;

e) compositing said second page group;

f) converting said third part of said plurality of pages to a third page group being expressed in said raster data format; and g) compositing said third page group, wherein said printing data are obtained through respective composition in said steps c), e) and g).

8. The method in accordance with claim 7, wherein said step d) comprises steps of:

d-1) extracting a first objective page being expressed in page description data from said second part, and d-2) converting said first objective page to said intermediate data format.

9. The method in accordance with claim 8, wherein said step f) comprises steps of:

f-1) extracting a second objective page being expressed in page description data from said third part, f-2) converting said second objective page to a third objective page of said intermediate data format, and f-3) converting said third objective page to said raster data format.

10. The method in accordance with claim 9, wherein each of said plurality of pages includes contents and page management data, said page management data includes an identifier indicating the data format of said contents, and said identifier is referred to in each of said steps b), d) and f).

11. The method in accordance with claim 10, further comprising a step of:

h) replacing a specified page of said printing data obtained through respective comosition in said steps c), e) and g) with a new page.

12. The method in accordance with claim 11, wherein said intermediate data format is a run-length format.

* * * * *